June 26, 1928.　　　H. P. RHODES　　　1,674,839
METALLIC PACKING
Filed June 23, 1923

Hampton P. Rhodes, Inventor

By Jesse R. Stone
Attorney

Patented June 26, 1928.

1,674,839

UNITED STATES PATENT OFFICE.

HAMPTON P. RHODES, OF HOUSTON, TEXAS.

METALLIC PACKING.

Application filed June 23, 1923. Serial No. 647,248.

My invention relates to improvement in metallic packing composition to be employed particularly in connection with reciprocating piston rods.

It is an object of the invention to provide a packing composition which will resist heat and wear and which may be compressed to expand the same when wear occurs.

It is another object of the invention to provide a packing composition which will be of durable material and practically self-lubricating.

Figure 1:
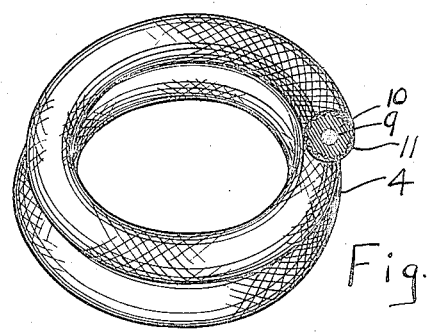
Figure 2:
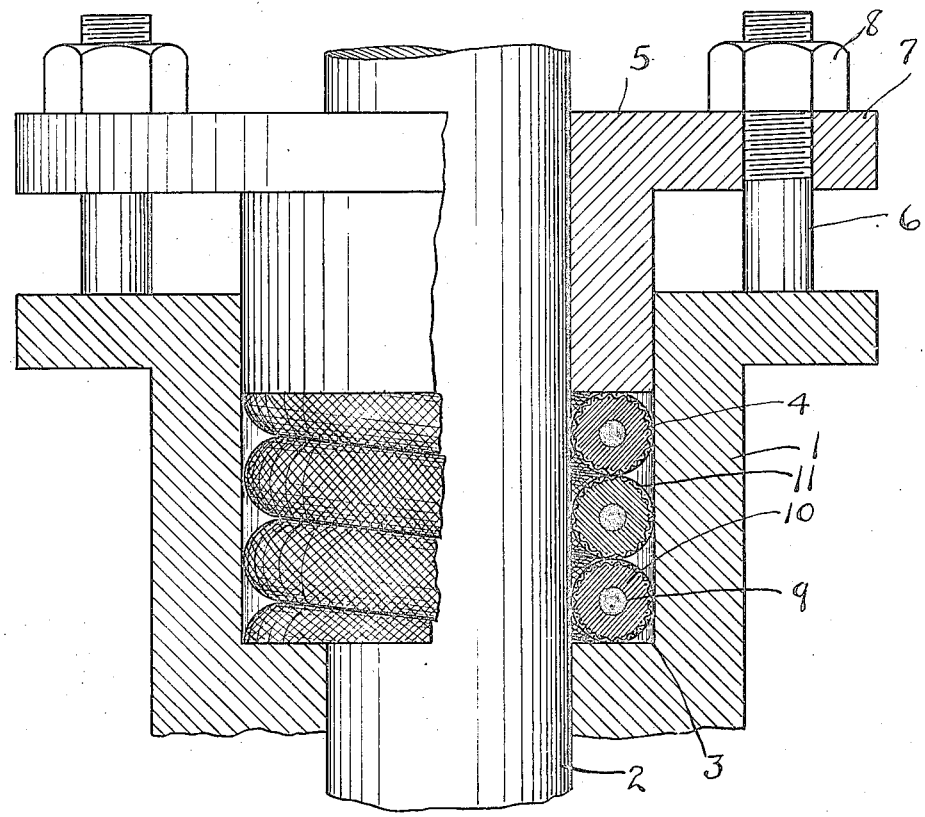

Other objects and advantages of my particular type of packing will be clear from the more detailed description which follows:

Referring to the drawing herewith wherein like numerals of referance are employed to designate like parts in all the views, Fig. 1 is a perspective view of a coil of packing made according to my invention and Fig. 2 is a broken side elevation of a piston rod shown as working in a stuffing box in which my packing is employed, certain parts being broken for greater clearness.

In the drawing I have shown my packing as used within a stuffing box 1 having a piston rod 2 working therethrough.

The stuffing box is recessed at its upper end to provide a stand or housing 3 for the packing 4 therein. A gland 5 is slidable within the packing seat 3 and may be adjusted vertically for expanding the packing by means of clamping bolts 6 secured in the upper end of the stuffing box and extending through the flange 7 on the gland 5. The nuts 8 on the said pins are employed to clamp the gland into contact with the packing.

I have shown the packing as made up of a cylindrical coil of packing material cut at each end on a bevel so as to fit between the gland and the lower recess of the stuffing box.

My packing is made up of a central core 9 of steam vulcanized rubber capable of withstanding the ordinary temperature of steam without injury. This core is surrounded by a thick layer of material 10 made up of strips of babbitt mixed with graphite and oil and compressed firmly about the rubber core. The packing thus constructed is surrounded by a web of fiber braid of tough material 11 adapted to protect the outer surface of the packing.

The packing thus constructed is capable of being compressed under the pressure of the gland 5 so as to force the same into close contact with the rod 2, thus making a fluid tight joint allowing the reciprocation of the rod but adapted to prevent leaking of steam past the packing. The central core being made of rubber will allow the distortion of the packing ring within the stuffing box under pressure in such manner as to make a practically tight joint. The babbitt mixed with the graphite and oil will withstand the heat and will need no lubricant further than the material of which it is made and will last for long periods of time. A packing made up of this material is found to be particularly efficient for the purpose stated and its advantages will be apparent to one skilled in the art without further description.

What I claim as new and desire to protect by Letters Patent is:

1. A metallic piston packing comprising a cylindrical core of rubber, a surrounding layer made up of a mixture of babbitt, graphite and oil, and an outer protecting cover of fabric.

2. A piston packing comprising a core of rubber, a surrounding layer of graphite, oil, and babbitt, and an outer protecting cover of flexible material.

In testimony whereof, I hereunto affix my signature, this the 19th day of June, A. D. 1923.

HAMPTON P. RHODES.